(12) United States Patent
Sneh

(10) Patent No.: US 6,266,635 B1
(45) Date of Patent: Jul. 24, 2001

(54) MULTITASKING INTERACTIVE VOICE USER INTERFACE

(75) Inventor: Nitzan Sneh, Ramat Hasharon (IL)

(73) Assignee: Contec Medical Ltd., Ramat Hasharon (IL)

( * ) Notice: Subject to any disclaimer, the term of this patent is extended or adjusted under 35 U.S.C. 154(b) by 0 days.

(21) Appl. No.: 09/349,863

(22) Filed: Jul. 8, 1999

(51) Int. Cl.[7] ................................................. G10L 15/00
(52) U.S. Cl. ...................... 704/235; 704/275; 704/270
(58) Field of Search .................................. 704/275, 270, 704/243, 258, 235; 395/604, 305; 379/63

(56) References Cited

U.S. PATENT DOCUMENTS 5,420,912 * 5/1995 Kopp et al. ............................ 379/63
5,519,808 * 5/1996 Benton, Jr. et al. .................. 704/270
5,812,977 * 9/1998 Douglas ................................ 704/275
5,884,266 * 3/1999 Dvorak ................................. 704/275

* cited by examiner

Primary Examiner—David D. Knepper
(74) Attorney, Agent, or Firm—Helfgott & Karas, P.C.

(57) ABSTRACT

A dictation and command voice multitasking interface is implemented by the creation of a question and multiple answer set database. The system is responsive to spoken words first recognized and then correlated with the previously recorded questions, commands or tasks. The system is interactive with the speaker, in a typical question and answer(Q&A) session until the completion of the task at hand. In the preferred embodiment, the Q&A session enables a doctor to create a report during clinical procedures using prerecorded database entrees correlated with spoken words and commands.

26 Claims, 9 Drawing Sheets

| USER'S VOICE 113 | ACTION BY SYSTEM 114 | VOICE CONFIRMATION 115 | ACTION 116 |
|---|---|---|---|
| 1. "PICTURE" 117 | SAVE PICTURE TO DISK 118 | "PICTURE" 119 | - |
| 2. "DICTATE" | STARTS DICTATION | "DICTATE" | OPENS SOUND TRACK |
| 3. "END" | STOPS DICTATION | "END" | - |
| 4. "REPORT" 120 | OPENS SET OF QUESTIONS TO SURGEON ACCORDING TO PREDEFINED SURGERY TYPE. 121 | | |
| 5. "NAME OF PROCEDURE" 122 | STARTS QUESTIONS 123 | | |
| 6. "PATIENT PREPARATION" 124 | LEGAL ANSWERS- "REGULAR", "NORMAL", "SICK", "BACK", "ETC." 125 | | |
| 7. "NORMAL" 126 | GENERATE TEXT- "THE PATIENT WAS NORMAL" 127 | "YES" | THE TEXT IS INSERTED FROM DATABASE TO FILE |
| | GENERATE QUESTION- "HOW MANY INCISIONS AND TYPE?"; LEGAL ANSWERS- "TWO, 5 mm"; "FOUR, 2-5 mm, 2-10mm"; "ONE, 10 mm" 128 | 129 | 130 |
| 8. "FOUR" 131 | GENERATE TEXT- "FOUR INCISIONS WERE MADE, TWO WITH 5 mm TROCARS, TWO WITH 10 mm TROCARS IN AREAS A, B, C, AND D." | "YES" | THE TEXT IS INSERTED FROM DATABASE TO FILE |
| | GENERATE QUESTION- "COMPLICATIONS AND BLEEDING?"; LEGAL ANSWERS- "NO", "BLEEDING", "OTHER" | | |
| 9. "NO" 132 | GENERATE TEXT- "NO COMPLICATIONS OR BLEEDING WAS ENCOUNTERED." | "YES" | THE TEXT IS INSERTED FROM DATABASE TO FILE |

FIG. 8

MULTITASKING INTERACTIVE VOICE USER INTERFACE

BACKGROUND OF THE INVENTION

1. Field of Invention

The invention relates generally to the field of voice directed dictation. More particularly, the invention provides for a system and method for an interactive voice interface.

2. Prior Art

From the very beginning of computer design, the aspirations of the designer have included a voice interaction with the computer. PC applications such as dictation, scheduling, display and voice command interfaces, communications, robotics and industrial controls were felt to be only a few of the many practical uses for such technology. Implementation, however, has been a slow and disappointing process. The spoken word comprises unlimited permutations of sounds, inflections, dialects, languages, volumes as well as the inclusion of ambient and communications related noise.

As technology has progressed, however, so has the ability to decipher the spoken word. In spite of the advancements in voice recognition, the prior art has failed to capitalize on the recent technology available to develop a precise, accurate and easy to use system which, not only recognizes the spoken words, but provides an interactive interface to commands as well as application specific report creation.

Whatever the precise merits, features and advantages of the prior art, it fails to achieve or fulfill the purposes of the present invention. Accordingly, it is an object of the present invention to provide for an interactive voice interface.

It is another object of the present invention to provide for a voice interface capable of multitasking.

It is an additional object of the present invention to develop an interactive voice activated question and answer session.

It is an additional object of the present invention to include commands in the interactive question and answer session.

It is an additional object of the present invention to enable a user to create a report during clinical procedures using prerecorded database entrees correlated with spoken words and commands.

These and other objects are achieved by the detailed description that follows.

SUMMARY OF THE INVENTION

A dictation and command voice multitasking interface is implemented by the creation of a question and multiple answer database. The system is responsive to spoken words first recognized and then correlated with the previously recorded questions, commands or tasks. The system is interactive with the speaker, in a typical question and answer(Q&A) session until the completion of the task at hand. Various salient elements include: timed dictation periods, silent period detection, multimedia applications; as well as multitasking to include mixtures of Q&A, commands and a variety of tasks.

In the preferred embodiment, the system is essentially set up for use by a physician and facilitates the creation of clinical reports (e.g., those used by a surgeon). Typically, a surgeon will perform a limited number of types of procedures. Each of the procedures performed requires a report to be done soon thereafter. A considerable amount of the report is a "boiler plate" including stock paragraphs such as the description of a disease, a description of the surgery, a description of the procedure, etc. In addition, certain particular items are related to the particular operation but are limited to specific types of information. For example, the number of sutures put in, the length of the cut, etc.

During the operation it is difficult for the surgeon to make use of their hands but their voice is readily available for dictating information with respect to the procedure. They can also use their voice for issuing commands such as "take a picture", "take an x-ray", "phone another doctor", etc.

The present invention permits the user to utilize their voice to dictate information which will be used as part of their report, to answer specific questions that are preset with fixed preset type answers, to issue commands such as taking a photograph, making a phone call, etc., all with the same system. Thereafter, the report will essentially be formatted by the system with all of the preset paragraphs, any unique paragraphs that the user has set in himself, as well as taking the answers to the questions and fitting them in appropriately to preset paragraphs. Thus, the final report will be automatically prepared. Of course, it can be edited by the user at any time on the computer.

Initially, the user must spend a little time with the system, training it to recognize their voice and setting up their own questions and answers. Each user has a different voice and therefore the system must be trained to accommodate each user's voice.

The system is also preset in various ways. Firstly, with respect to ongoing dictation during the procedure, it is set to limit the length of a dictation. For example, the user may issue the voice command to "start dictation". The machine will then turn on the receiver and give the user a preset period of 28 seconds, for example, to dictate. After this period has expired the system will either verbally or in writing tell the user the dictation is over. The user must then reinstitute the command if additional dictation is required. This is typical, for example, a surgeon will only dictate short statements during a procedure.

The system is also set to check on fixed periods of silence. After a voice is detected, it has a preset amount of time whereby it expects additional words. The length of these silent periods are prefixed.

Initially when a user wants to set up the system, they enter the system, put in their name, and identify a particular procedure that is to be set up. For example, a doctor might enter "gall bladder". At that point, the system will bring up prerecorded paragraphs relating to the "gall bladder" and they can select which ones they want to make use of. They may also want to enter their own "boiler plate" paragraphs regarding aspects of gall bladder operations in general.

The user begins by setting up the voice aspects of the program. They then begin by printing a particular question relating to the procedure. Thereafter the question is recorded. They then proceed to print the individual answers that can be given which are recorded individually.

BRIEF DESCRIPTION OF THE DRAWINGS

FIG. 8 illustrates examples of various commands that have been preassigned.

DESCRIPTION OF THE PREFERRED EMBODIMENTS

Figure 1:
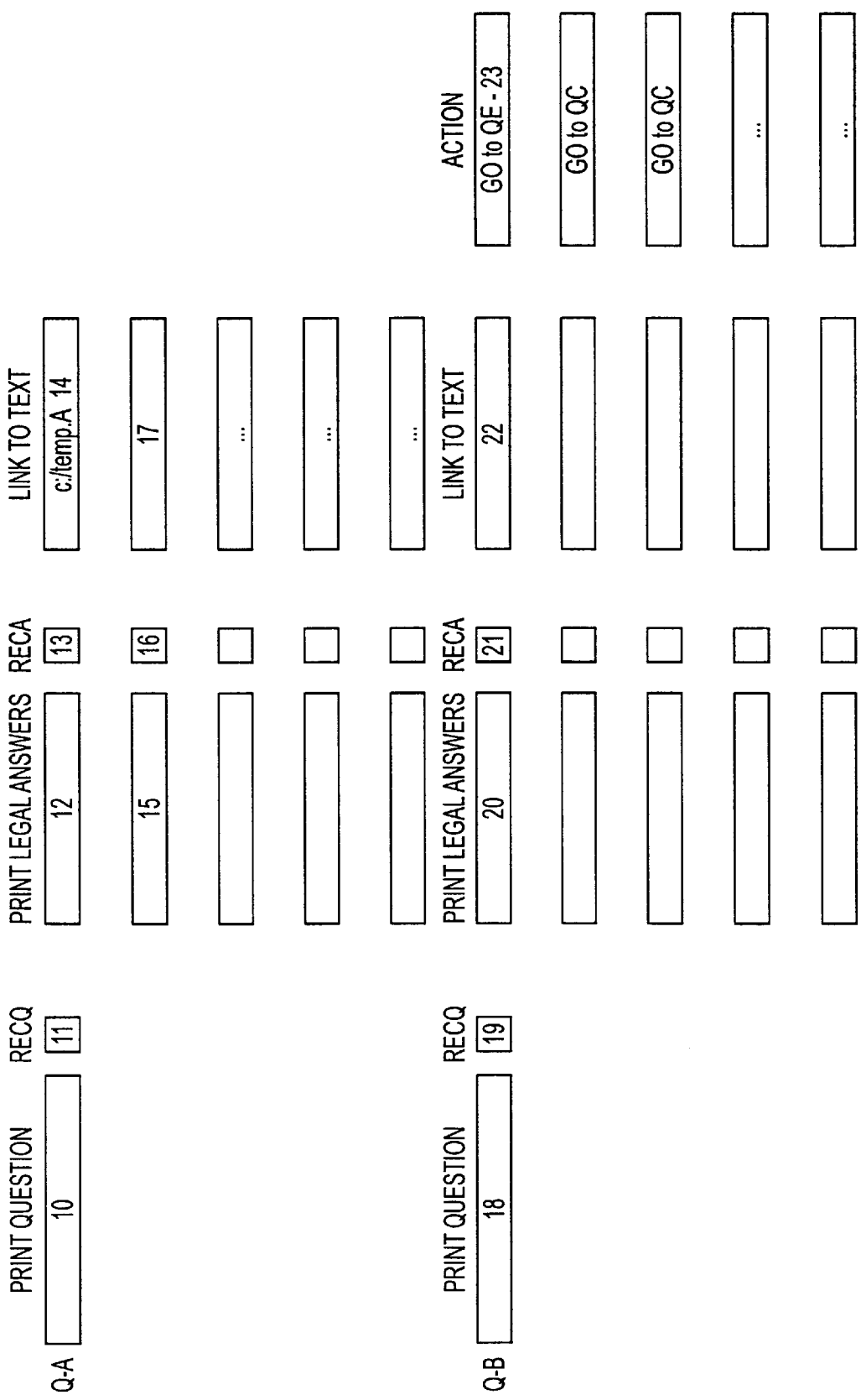
FIG. 1 illustrates the basic interface framework used to set up and record a Q&A session.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

FIG. 1 shows a GUI computer training template to be displayed on a computer terminal CRT or equivalent display and used to enter and record a series of questions and associated answers. It is this template that enables the practitioner to record a series of standardized responses to a series of recorded questions associated with a specific procedure, or alternatively, record their own personalized responses. A first box 10, labeled "print question", receives the typed text for a question "A" in box 10 and "B" in box 18. The "RecQ" box 11 is selected by a cursor (e.g. by using a mouse) and the user records their voice equivalent to the typed text of the question. The voice is recorded in computer memory (part of 134—FIG. 9) as received from a microphone 138 and associated computer audio processing hardware/software 137. The user then repeats the procedure, initiating a voice recording 13, 16 for the one or more possible answers 12, 15. For each answer a link 14, 17 is made to "boiler plate" supportive text which will be output to a final report. In addition, as shown for question B, links may also be made to additional actions 23 to be taken based on a particular selected answer 20.

The following is an example of the type of questions and the various legal answers that the user can give that will be accepted. A first question is asked—"What is the day today?"; Answer—"Tuesday; Question—"Today is Tuesday, how is the weather?"; Answer—"Cloudy"; Question—"It is cloudy today, temperature over 60 degrees?; Answer—"Yes". Using the linked text for each of the answers would produce the following text: "Today is Tuesday, the weather is cloudy and the temperature is over 60 degrees Fahrenheit."

Figure 2:
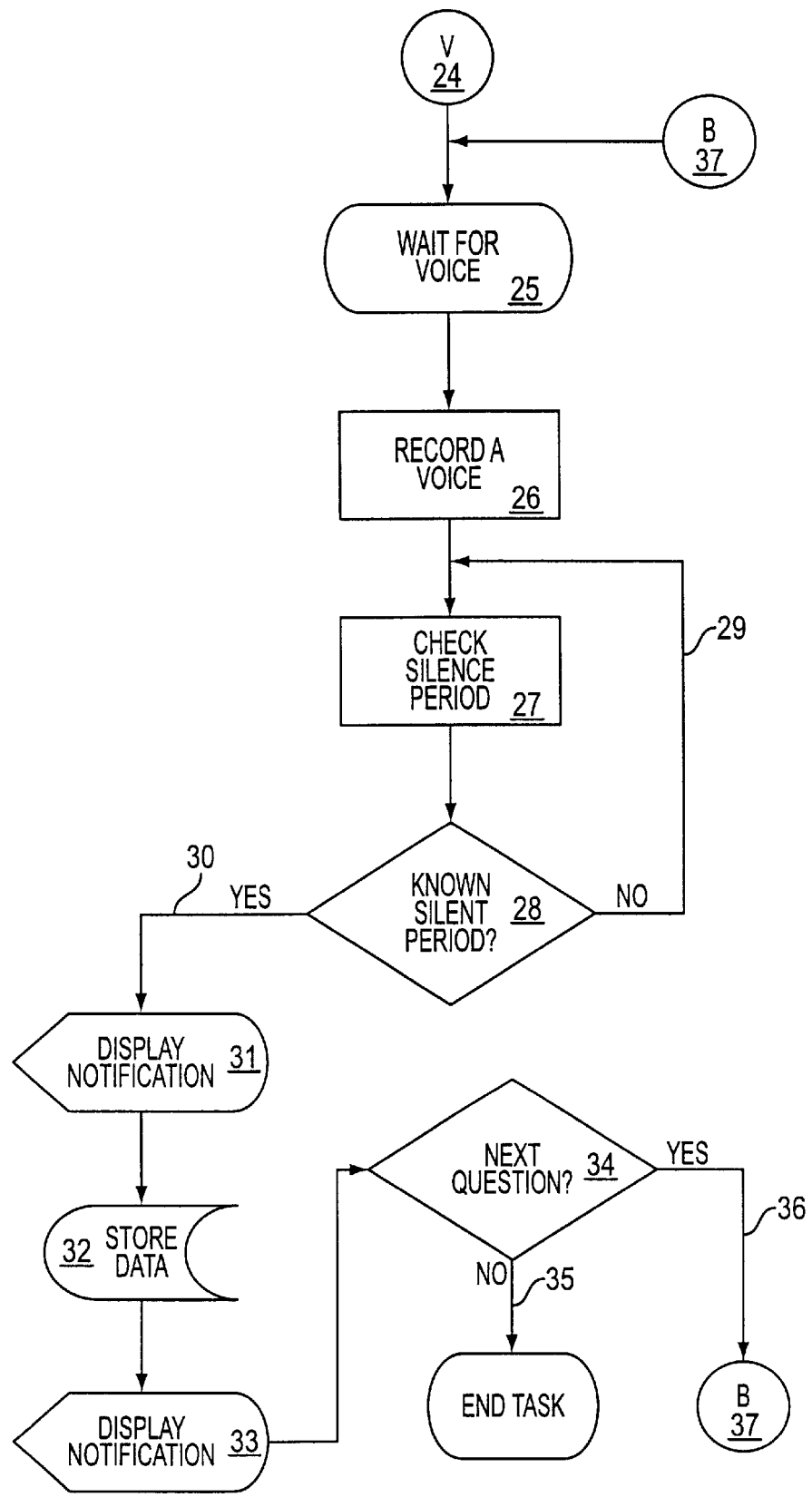
FIG. 2 illustrates a flowchart for recording questions and their associated answers.

FIG. 2 shows the flowchart for recording such questions and answers. Note that the flowchart can also be used for setting up commands, as will hereinafter be explained.

In the flowchart, the computer waits 25 for a voice 24. It then records the voice 26. It waits a prefixed silence period 27 that has been set. If the amount of silence 28 has not been reached 29 and more words are coming in, it continues to record and then checks the silent period. When the total silent period has been reached 30 indicating that the end of the statement has been concluded for the question or command, it then displays the information 31 that has been recorded and stores it 32, and then advises that the information has been stored 33. It then goes on to ask whether a next question or a next answer etc. 34 is to be given. If the answer is yes 36, it goes back to the beginning 37 and repeats. Otherwise, it completes this subprogram 35.

Figure 3:
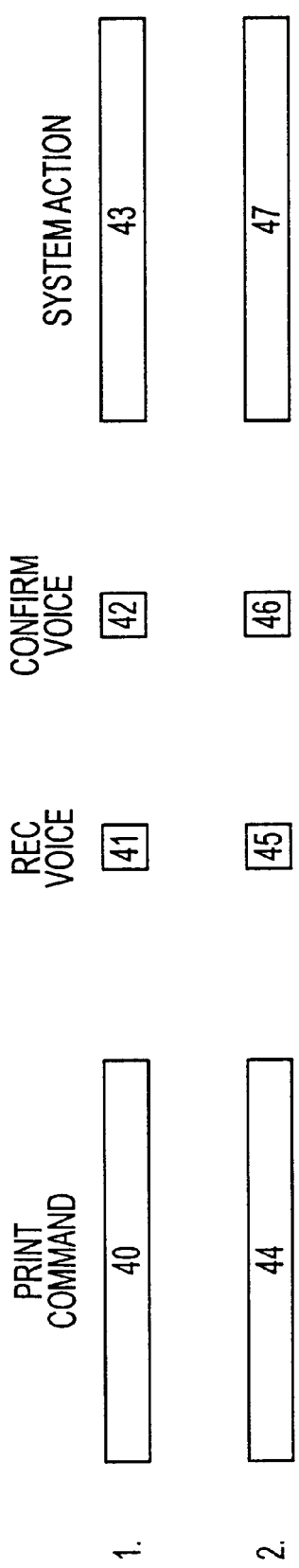
FIG. 3 illustrates the basic interface framework used to set up and record a command.

This routine can also be used for setting up commands as is shown in FIG. 3. Commands are entered in blocks 40 and 44. The voice equivalent is recorded by activating "Rec Voice" 41 and 45 as previously described above. The voice equivalent is confirmed in blocks 42 and 46 and the specific system action to be taken for each command is entered into blocks 43 and 47 for their respective commands 40, 44.

The following is an example of a series of commands that the doctor would enter at the time of set up. They would enter the command "phone call" by typing it into the system. They would then record the phone call. The system will come back with a further question if they are initiating a phone call now. They then give an answer "yes". Thereafter it will go to a next command. The next command typed in will be "call Dr. John". They would then record the voice "call Dr. John" into the computer. The computer will come back with a confirmation saying "calling Dr. John now" and they would record the answer yes. The action then will be to dial a modem and the speaker to place the call. The third command which might be entered is "terminate the call". They will record the words "hang up". The computer will come back with the confirmation "hang up" and they will answer yes. This is the type of protocol that is initially set-up for a series of commands.

Figure 4:
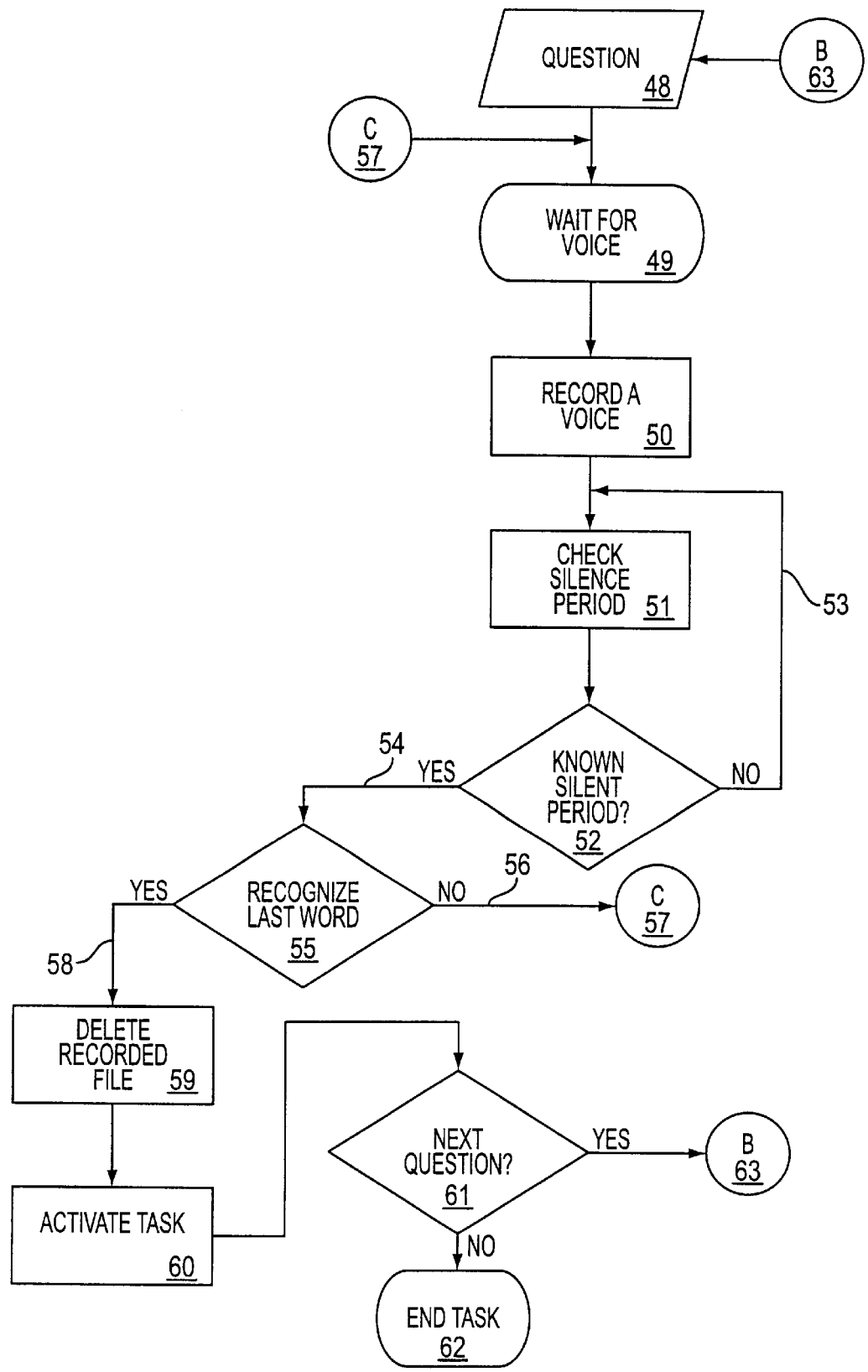
FIG. 4 illustrates the interactive protocol interface used during recognition of a specific word.

FIG. 4 shows a flow diagram of the protocol to recognize a specific word during the course of the operation. In this case a particular question 48 has been stored in the voice file. This can be any of a number of questions that have been preset. The system waits 49 until a voice appears. It then records the voice 50 continuously waiting 51 until a preset silent period 52 has been reached. Until a preset period is recognized, the system returns 53 to the check silence period 51. Simultaneously 54, it keeps checking whether it recognizes the last word of the question 55. This is to prevent a situation where a person waits a long time between words of a question. If the last word is not recognized 56, the system returns to wait for a voice 57.

When it finally recognizes the last word 58 of the particular question, it then deletes the just recorded file 59. It then proceeds to activate a task 60 either by storing the answer or proceeding with the next part of that series of the questions or any specific task associated with the result of that question. Thereafter, it checks whether there is a next question 61. If yes, then it goes through the same routine 63, if not it ends the task 62.

Figure 5:
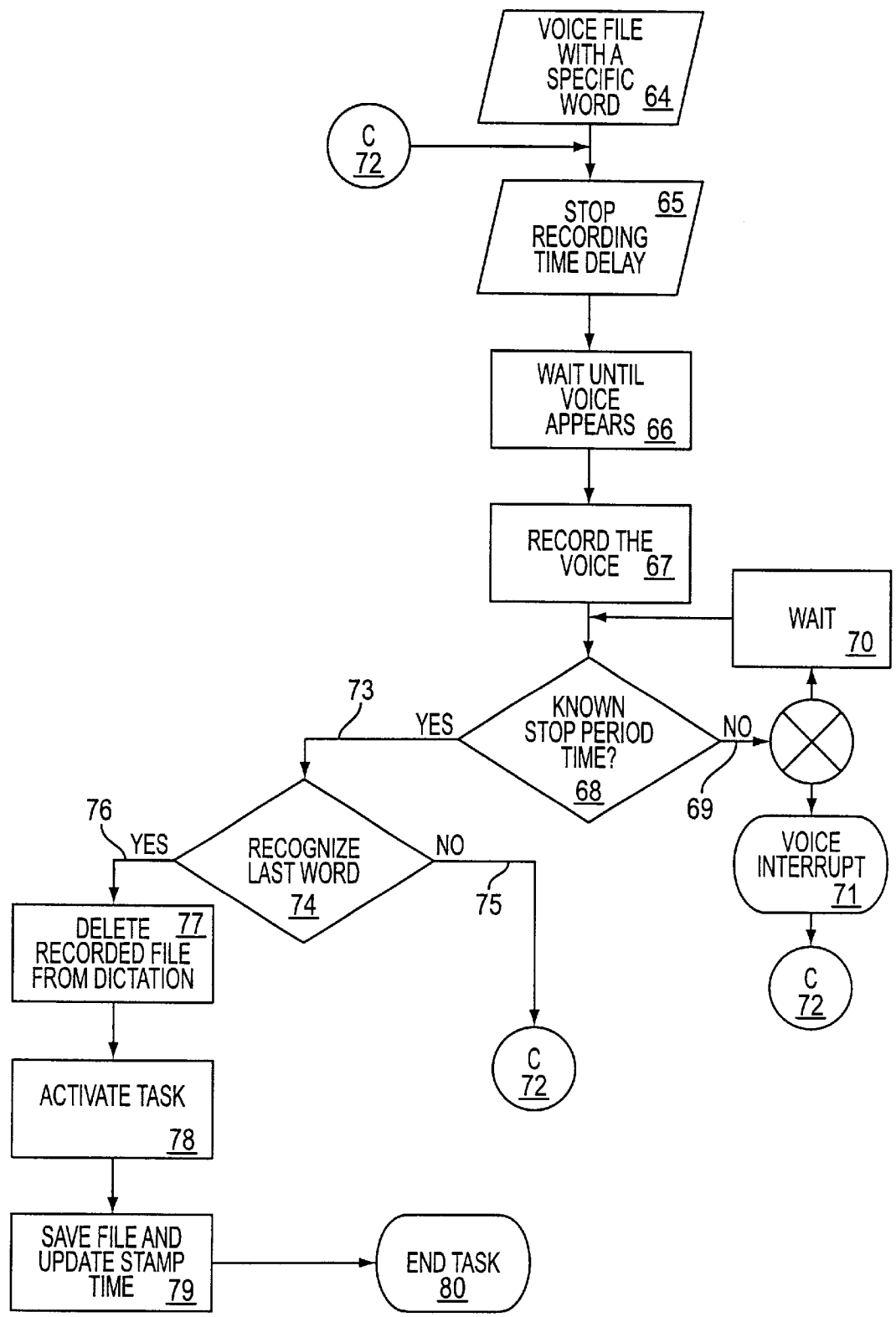
FIG. 5 illustrates a flow chart of a multitasking/multi reading sequence wherein a command interruption takes place during a dictation period.

One of the key features of the present invention is that it permits multitasking/multi-reading in order to avoid a loss of voice. Specifically, when the doctor is in the midst of dictating during one of the assigned dictating periods following their command to "start dictation", the doctor may want to issue a command. For example, while a doctor is the middle of dictating they may want a picture taken. However, thereafter they may want to continue dictating for the balance of the time. FIG. 5 shows the flowchart for such situation. In such case the system already has the voice file with the specific words relating to the commands 64, and a preset time delay 65, in this case 28 seconds, of how long a dictation is to occur. During dictation, it waits until a voice appears 66. It records that voice 67 just as normally during the dictation. Each time it records a voice it waits a particular stop time 68 set in between words. Every time it reaches the end of that delay between words 73 it recognizes whether that is the last word of a command 74. If not, it returns to C 72. If it is 76, it then deletes this command 77 from the actual dictation so that ultimately when the dictation is recorded it does not include the interruption for the command. It then goes on to activate the task 78 such as taking the photo or the x-ray. It then saves the information on the task performed such as the taking of the photographs etc. with it timed exactly so that ultimately the doctor will know when the picture was taken, or when the phone call was made 79 and ends task 80. At the same time 69, while it is waiting for this period of time 70 if a voice continues, it recognizes the voice interrupt 71 and goes back 72. At step C 72 it will continue the recording until the 28-second period elapsed. This way it can continue receiving dictation and at the same time when it is interrupted by a command, it responds to the command signal and still does not lose any of the dictation.

Figure 6:
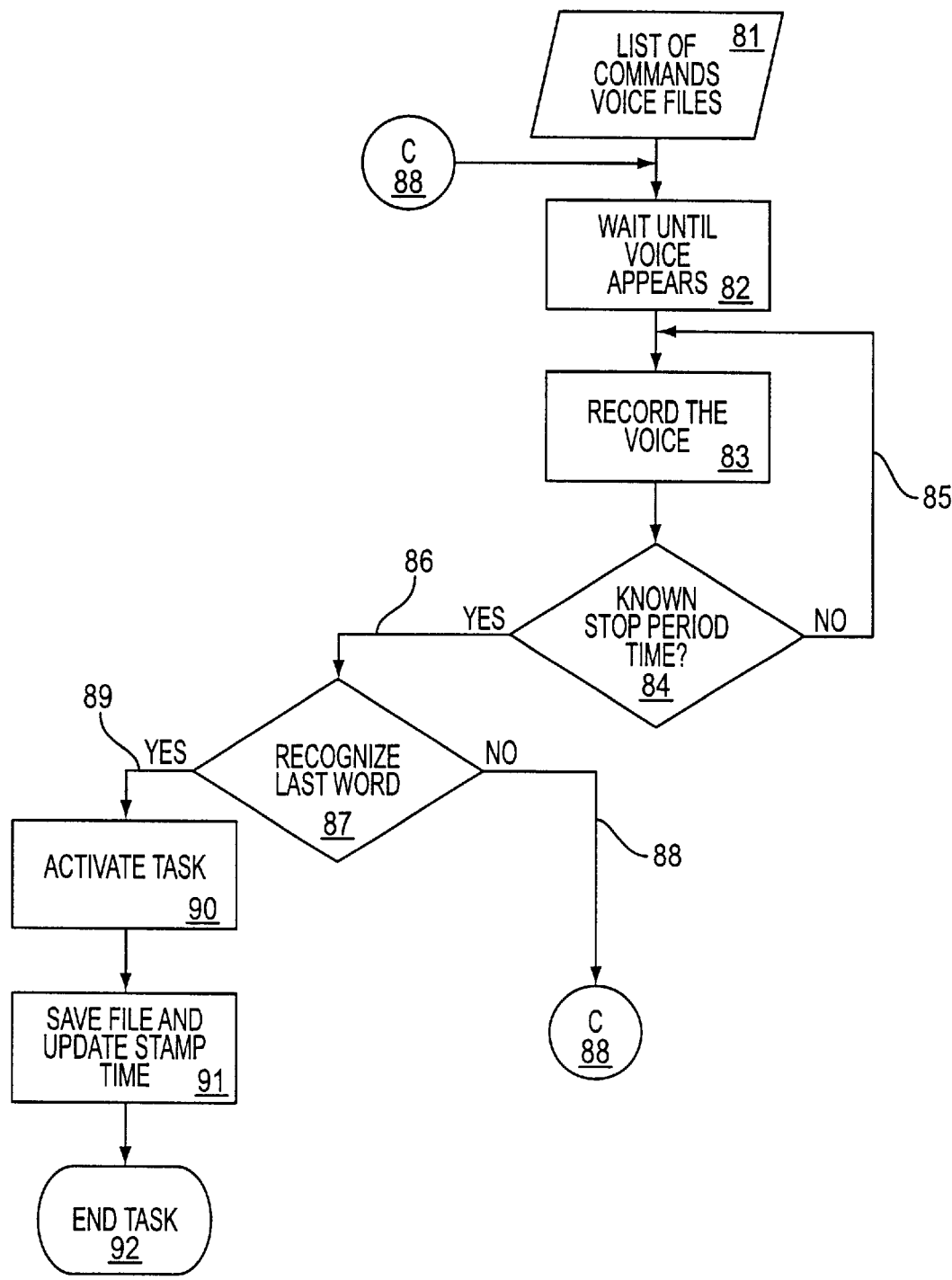
FIG. 6 illustrates flowchart when a command signal is given during operation of the system.

FIG. 6 shows the flowchart when a command signal is given during the course of the operation. The system already has stored a list of the command files 81 and it waits until a voice appears 82 and it records the voice 83 until a known time period count 84, 85. It returns to "C" 88 until the last word is recognized 87. When it finally recognizes the last word 89, it then returns with the recognized command task 90 which has to be done or other preset response. It then saves the file together with a stamp 91 indicating when the command took place and what was done, and thereafter ends the task 92.

Figure 7:
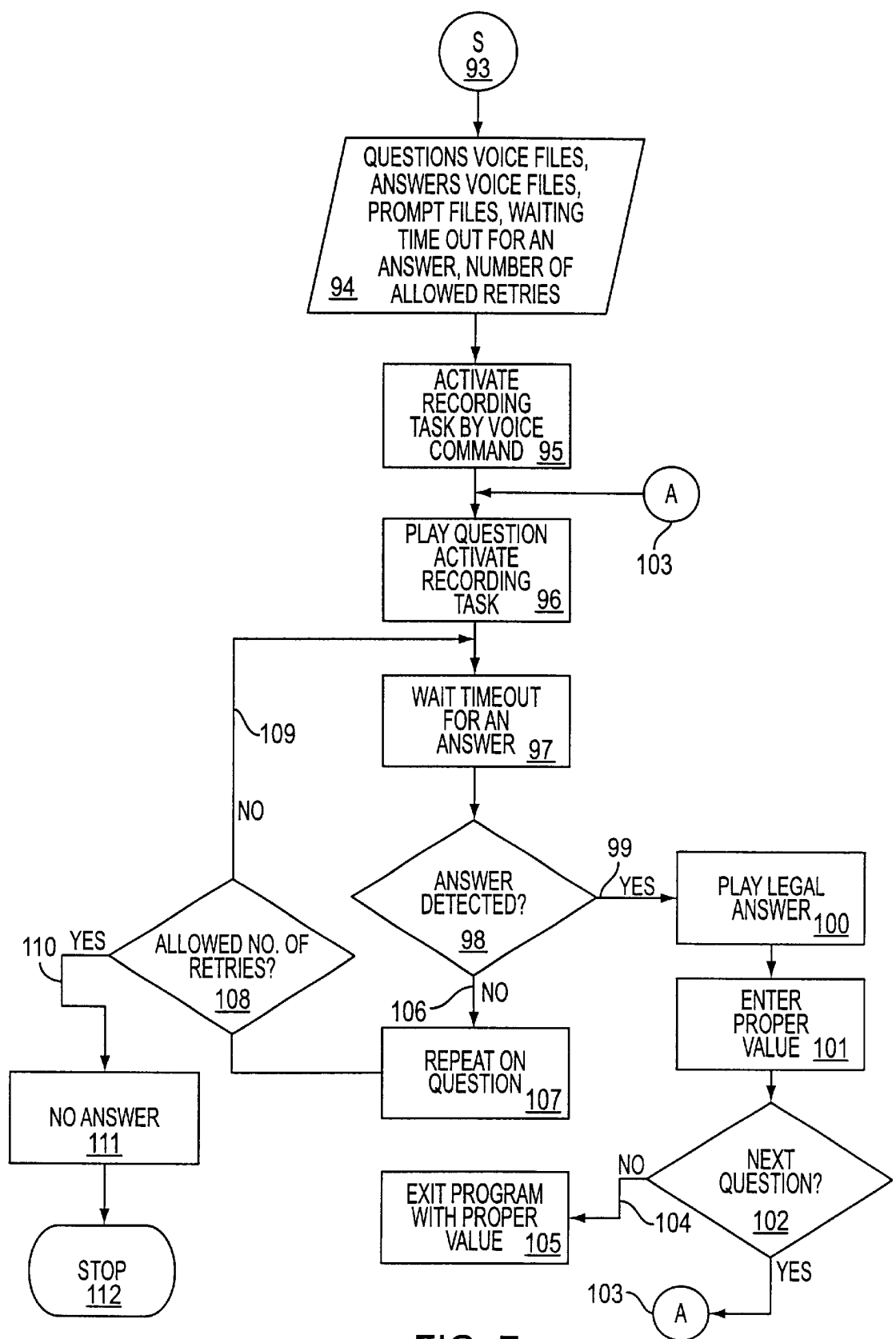
FIG. 7 illustrates a detailed flowchart during a Q&A session.

FIG. 7 shows in detail the flowchart during a question and answer session which is taking place during a procedure. In this case there is already stored 93 all the questions in a voice file, the answers in a voice file, any prompts 94 that have been previously recorded, as well as a fixed time for waiting for an answer. There is also a prefixed number of allowed retries.

This sequence is activated by a particular voice command 95 to start particular questions relating to a particular protocol. It then plays the question 96 and then activates the recording task and waits for an answer 97. It detects if the answer was given 98. If not 106, it repeats the question 107. A prefixed number of retries 108 is permitted. If it detects that it is a proper answer 99, it then enters that information as a proper answer 100 and stores the information 101. It then goes on to the next question 102, 103. If the maximum number of tries has been reached 110, the system determines that no answer 111 has been received and the system stops 112.

FIG. 8 gives an example of various commands that have been preassigned such as "picture" 117, etc. It indicates what the user's voice (column 113) is for the command (117, 120, 122, 124, 126, 131 and 132) what action is taken by the system (column 114), for example "save picture to disk" 118 and the voice confirmation (column 115), for example "picture" 119, given by the system back to the user; also, any additional action (column 116) that has to be taken. It then shows the series of questions and answers. In this case, the command key is "report" 120 which begins the question and answer section 121 and illustrates some examples of the questions and answers 125, 127, 128, etc. and the protocol that takes place. Block 129 indicates a confirmation of text to be entered 130 into the final report.

Figure 9:
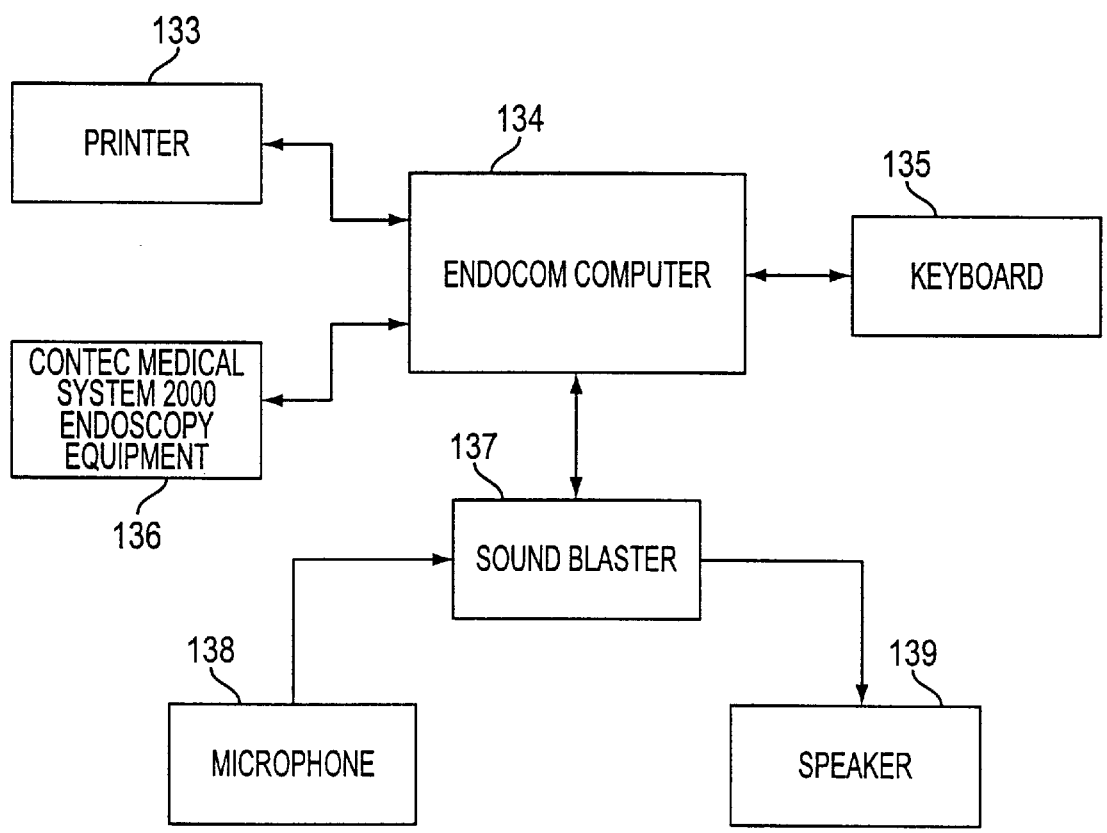
FIG. 9 illustrates a hardware diagram of an endoscope embodiment using the present invention.

FIG. 9 is a block diagram of the hardware used to implement a endoscopic embodiment of the invention. It basically consists of a computer 134 with the keyboard 135 and printer 133. It has a connection to a medical device such as the Contec Medical System 2000 Endoscopy Equipment 136. This permits the surgeon, during the course of an operation, to take endoscopic photos and dictation and integrate them into a composite report. The invention can be connected to other external equipment which can be controlled such as a telephone, modem, an x-ray machine, etc. The voice end is controlled through a microphone 138 and a speaker 139 to a sound interface 137 to the computer. The configuration has been shown to illustrate a preferred embodiment of known hardware. Functionally equivalent elements can be used without departing form the scope of the present invention.

CONCLUSION

A system and method has been shown in the above embodiments for the effective implementation of a multi-tasking interactive voice user interface. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited to a specific application, medical or otherwise, questions or question structures, answers or answer structures and may be implemented in various known computer languages, environments and communications standards. Voice recognition can be implemented by known voice recognition programs, including a variety of hardware and software. In addition, the present invention can be implemented locally on a single PC, connected workstations (i.e. networked-LAN), across extended networks such as the Internet or using portable equipment such as laptop computers or wireless equipment (RF, microwaves, infrared, photonic, etc.)

What is claimed is:

1. A computer implemented voice interactive dictation system comprising:
    a graphical user interface training template, said training template receiving entered text and equivalent voice representations, comprising:
    one or more question text entry sections, each of said one or more question text entry sections comprising at least one associated answer text entry section;
    a voice recording activation element initiating recording voice equivalents of text entries of said one or more questions and associated answers;
    a related text file name and location entry;
    computer memory receiving and storing entered questions, answers, recorded voice data and related text files;
    a voice recognition system including a microphone, and said voice recognition system receiving spoken words during a monitored dictation period, correlating the spoken words to recorded questions and answers and retrieving a related text file to thereby create a dictated report.

2. A computer implemented voice interactive dictation system as per claim 1, wherein said graphical user interface further comprises command text entry, voice equivalent recording and command actions to be taken.

3. A computer implemented voice interactive dictation system as per claim 2, wherein said system is multitasking, integrating both text and commands into said monitored dictation period.

4. A computer implemented voice interactive dictation system as per claim 2, wherein said system further comprises a time stamp capability.

5. A computer implemented voice interactive dictation system as per claim 2, wherein said commands include any of: picture or voice recording, acquiring data from auxiliary devices, Internet or e-mail, and telephone call placement.

6. A computer implemented voice interactive dictation system as per claim 1, wherein said dictated report documents a clinical procedure.

7. A computer implemented voice interactive dictation system as per claim 1, wherein said graphical user interface, said computer memory means, and said voice recognition system are locally connected using personal computing equipment.

8. A computer implemented voice interactive dictation system as per claim 1, wherein said graphical user interface, said memory means, and said voice recognition system are connected across a communications network.

9. A computer implemented voice interactive dictation system as per claim 8, wherein said communications network is the Internet.

10. A method of creating question and answer decision scripts for a computerized dictation system comprising:
    entering one or more text passages into a training graphical user interface;
    entering one or more questions into said training graphical user interface;
    recording speech equivalents to each of said questions;
    associating said entered questions with said corresponding speech equivalent recordings;
    entering one or more text answers to each of said plurality of questions into said training graphical user interface;
    recording speech equivalents to each of said answers;
    associating said entered answers with said corresponding speech equivalent recordings;
    assigning at least one action to each of said entered answers;
    assigning at least one of said text passages to each of said entered answers;
    storing each of said entered elements and recorded speech in computer memory;
    entering one or more commands into said training graphical user interface, recording speech equivalents to each of said commands, associating said entered commands with said corresponding speech equivalent recordings, entering one or more actions to be taken in response to each of said plurality of commands into said training graphical user interface, recording speech equivalents to each of said actions to be taken and storing said entered elements and recorded speech in computer memory, and
    wherein said created question and answer scripts are retrieved from said computer memory interactively during said computerized dictation.

11. A method of creating a question and answer decision script for a computerized dictation system as per claim 10, wherein said commands include any of picture recording, acquiring data from auxiliary medical devices and telephone call placement.

12. A method of creating a question and answer decision script for a computerized dictation system as per claim 10, wherein said questions, answers, actions, text passages and commands pertain to a medical procedure.

13. A method of creating a question and answer decision script for a computerized dictation system as per claim 10, wherein said method is performed on personal computing equipment.

14. A method of creating a question and answer decision script for a computerized dictation systems per claim 10, wherein said method is performed over a communications network.

15. A method of creating a question and answer decision script for a computerized system as per claim 14, wherein said communications network is the Internet.

16. A method of implementing a computerized voice interactive dictation system comprising:
    creating one or more scripts during a training period by recording text and equivalent voice representations using a graphical user interface, said scripts pre-stored in computer memory before dictation;
    activating a pre-stored script comprising one or more items including any of: questions with associated answers, commands, actions and text passages;
    repeating the following steps for each of said one or more items during a monitored time period:
      receiving a start command;
      receiving a spoken response;
      correlating a spoken response with one or more of said pre-stored script items;
      if said spoken response is determined to be a pre-stored answer, identifying and sequentially storing in computer memory, an associated pre-stored text passage;
      if said spoken response is determined to be a pre-stored command, performing an associated pre-stored action, and
    interactively creating a report based on voice recognition of said responses, insertion of said associated text passages into said report, and performance of said pre-stored actions.

17. A method of implementing a computerized voice interactive dictation system as per claim 16, wherein said items of said pre-stored script pertain to a clinical procedure.

18. A method of implementing a computerized voice interactive dictation system as per claim 16, wherein said commands include any of: picture or voice recording, acquiring data from auxiliary devices, Internet or e-mail, and telephone call placement.

19. A method of implementing a computerized voice interactive dictation system as per claim 16, wherein said method is performed on personal computing equipment.

20. A method of implementing a computerized voice interactive dictation system as per claim 16, wherein said method is performed over a distributed communications network.

21. A method of implementing a computerized voice interactive dictation system as per claim 16, wherein said distributed communications network is the Internet.

22. A method of implementing a computerized voice interactive dictation system as per claim 16, further comprising the step of time stamping correlated commands.

23. An article of manufacture comprising a computer user medium having computer readable program code embodied therein which implements an interactive, multitasking dictation session comprising:
    creating a pre-stored script using a training graphical user interface which directs entry of one or more items including any of: text of questions with associated answers, text of commands, text of actions, text passages and voice equivalents of said questions, answers and commands;
    activating said pre-stored script;
    repeating the following steps for each of said one or more items during a monitored time period:

receiving a start command;

receiving a spoken response;

correlating a spoken response with one or more of said pre-stored script items;

if said spoken response is determined to be a pre-stored answer, identifying and sequentially storing in computer memory, an associated pre-stored text passage;

if said spoken response is determined to be a pre-stored command, performing an associated pre-stored action.

24. An article of manufacture as per claim 23, wherein said items of said pre-stored script pertain to a clinical procedure.

25. An article of manufacture as per claim 23, wherein said commands include any of: picture or voice recording, acquiring data from auxiliary devices, Internet or e-mail, and telephone call placement.

26. A computer implemented clinical procedure voice interactive dictation system, said system creating a report related to a specified clinical procedure, comprising:

a clinical procedure graphical user interface training template comprising:

one or more question text entry sections, each of said one or more question text entry sections comprising at least one question to be asked by the system during a dictation period of said clinical procedure, and an associated answer text entry section, said associated answer comprising an expected response by said user to said question during said dictation period;

a voice recording activation element initiating recording user voice equivalents of text entries of said one or more clinical procedure questions and associated answers;

a related text file name and location entry, said text file providing supportive text to insert in said report in response to specific answers given during said dictation period;

computer memory receiving and storing entered questions, answers, recorded voice data and related text files;

a voice recognition system including a microphone, and said voice recognition system receiving spoken words during a monitored dictation period, correlating the spoken words to recorded questions and answers and retrieving a related text file to thereby create said dictated report.

* * * * *